United States Patent [19]
Morrison

[11] 3,995,108
[45] Nov. 30, 1976

[54] TELEVISION APERTURE CORRECTION SYSTEM HAVING GATEABLE CORING MEANS FOR NOISE CANCELLATION

[75] Inventor: Eric Fraser Morrison, Redwood City, Calif.

[73] Assignee: Ampex Corporation, Redwood City, Calif.

[22] Filed: May 21, 1975

[21] Appl. No.: 579,605

[52] U.S. Cl. .......................... 178/7.2; 178/DIG. 25
[51] Int. Cl.² .......................................... H04N 5/14
[58] Field of Search .............. 178/DIG. 26, DIG. 34, 178/DIG. 12, DIG.25, 7.2, 7.1; 358/35, 36, 37; 325/473, 476, 65; 328/167

[56] References Cited
UNITED STATES PATENTS

| | | | |
|---|---|---|---|
| 3,665,321 | 5/1972 | Michnik | 325/476 |
| 3,715,477 | 2/1973 | Olson et al. | 178/DIG. 12 |
| 3,789,133 | 1/1974 | Kline | 178/DIG. 25 |
| 3,804,980 | 4/1974 | Lowry | 178/DIG. 25 |

*Primary Examiner*—John C. Martin

[57] ABSTRACT

An aperture correction system employing a tapped delay line includes an integral detection/gating circuit, whereby the combination generates an improved video detail signal by removing the objectionable noise and low amplitude components which are emphasized during the aperture correction process, while retaining the original shape of the high frequency video detail transitions as enhanced by the aperture correction process. The objectionable noise cancellation is provided by selectively gating the aperture correction signal via the detection/gating circuit in response to a selected gating waveform provided from the video detail signal itself. The detection/gating circuit may be selectively disabled to cause severe attenuation of the waveform at selected low and high frequencies outside the passband of the system.

8 Claims, 13 Drawing Figures

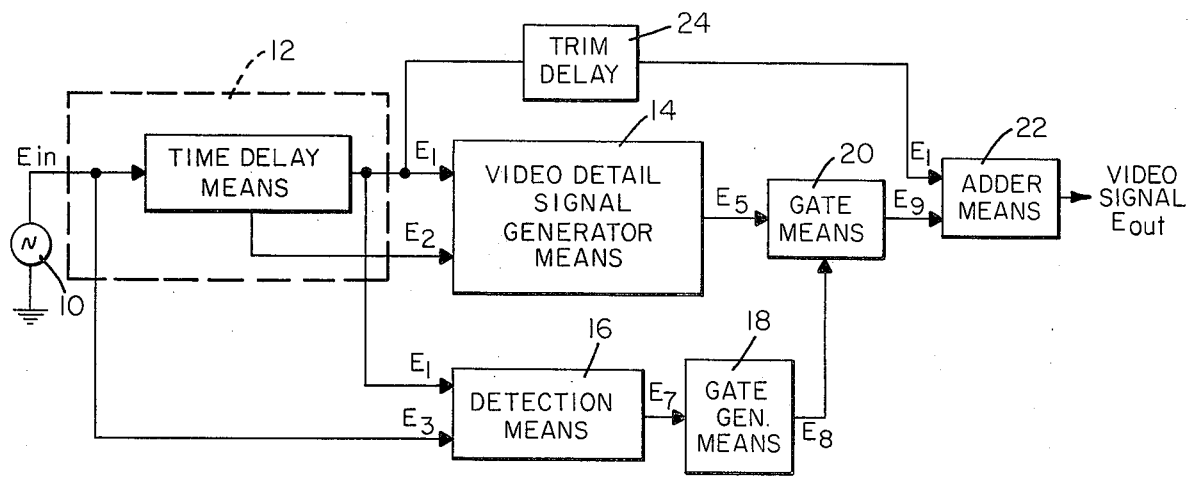
FIG_1
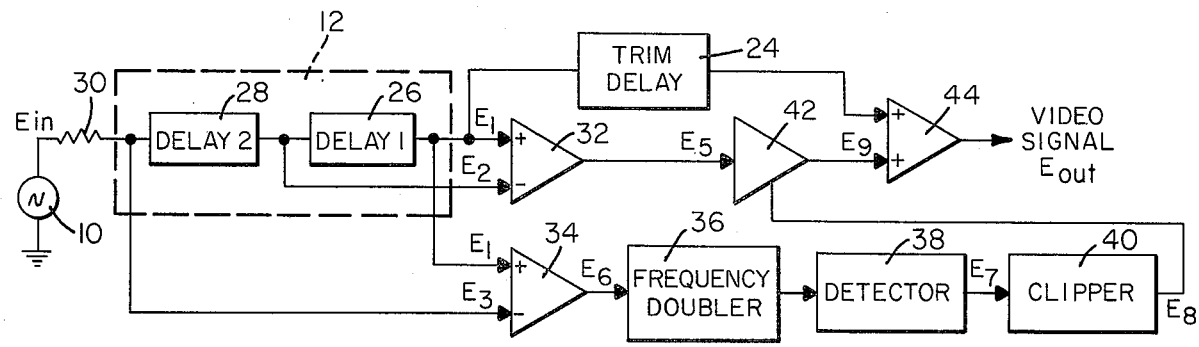
FIG_2
FIG_3A  $E_1$
FIG_3B  $E_2$
FIG_3C  $E_5(E_1-E_2)$
FIG_3D  $E_3$
FIG_3E  $E_6(E_1-E_3)$
FIG_3F  $E_7$   ——THRESHOLD
FIG_3G  $E_8$   ——ON / ——OFF
FIG_3H  $E_9$
TIME

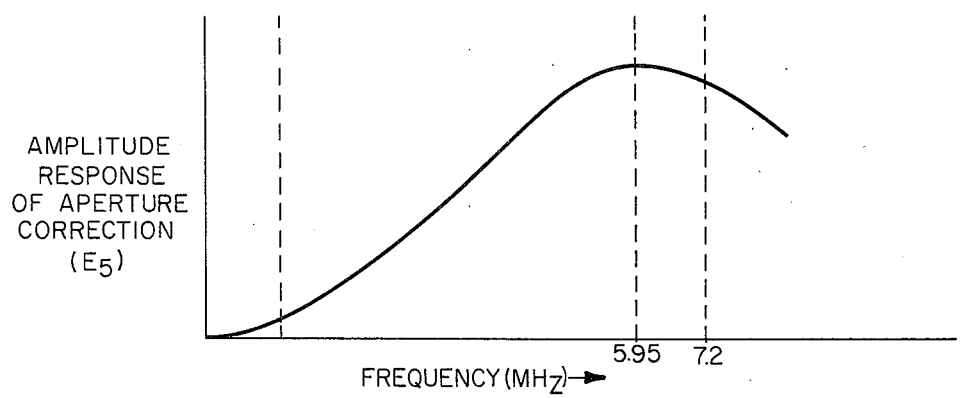
FIG_4
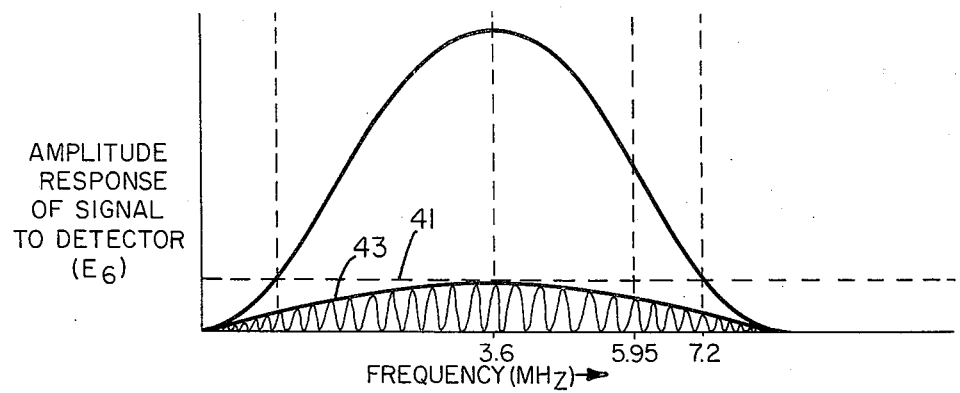
FIG_5
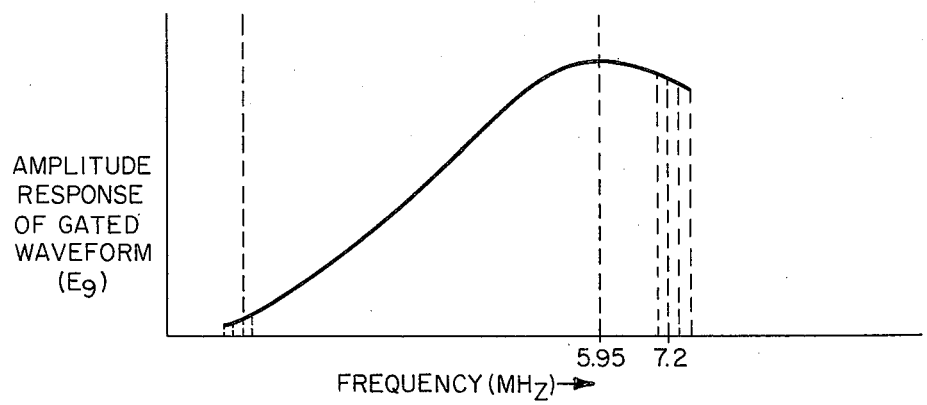
FIG_6

TELEVISION APERTURE CORRECTION SYSTEM HAVING GATEABLE CORING MEANS FOR NOISE CANCELLATION

FIELD OF THE INVENTION

1. Field

The invention relates to aperture correction techniques in the television art, and particularly to an improved aperture corrector circuit employing a gateable "coring" technique for removing the objectionable noise and low amplitude components emphasized during conventional aperture correction processes.

2. Prior Art

In scanning processes employing a scanning spot or aperture, such as in the field of television, some fine detail information is lost due to the finite size of the scanning spot or aperture, as well as other optically associated losses, such as caused by lens aberrations, surface dirt, etc. The loss, or smear, is generally symmetrical in space and thus, in the waveform, is symmetrical in time. It follows that conventional aperture loss correctors provide non-linear means for sharpening the video detail (luminance) transitions, without losing symmetry, i.e., for distorting the transfer characteristics of the signal in a manner to attenuate low amplitude components more than high amplitude components. However, since the aperture correction process increases the amplitudes of higher frequency components relative to the low frequency components, it also increases the relative amplitude of noise without increasing the signal magnitude. Consequently, the signal-to-noise ratio of the video signal is deteriorated rather than enhanced.

Typical aperture correction systems may be found in the articles "Horizontal Aperture Equalization," A. N. Thiele, Proceedings I.R.E.E. Australia, November, 1969; "Improved Signal Processing Techniques for Color Television Broadcasting," R. H. McMann, Jr. et al., Journal of the SMPTE, Vol. 77, March, 1968; and "A Determination of Optimum Number of Lines in a Television System," R. D. Kell et al., RCA Review, Vol 5, July, 1940.

A further technique, known generally in the art as coring, may be employed to remove the objectionable noise generated by the aperture correction process, wherein coring may thus be defined as a process for removal of the objectionable noise due to the high frequencies emphasized during the luminance enhancement of the vido signals. Such a coring tehnique generally provides a clipping nework, within the video detail signal path, defined by a pair of diodes which clip the positive and negative going signals of the aperture correction signal in response to a selected bias applied to the diodes. The clipped signal and the initial aperture correction signal are then recombined to provide a resulting aperture correction signal with improved noise characteristics. An example of such a coring system may be found in the Parts Lists Schematics Manual for the BC-230B Studio Color Camera System, Ampex Corporation, Redwood City, Cal. However, the above prior art noise reduction technique provides an artificially generated transition which, when applied to the aperture correction signal, causes severe distortion thereof, thereby detracting from the sharpness of the video picture.

SUMMARY OF THE INVENTION

The invention combination provides an improved aperture correction/coring means for enhancing the transitions corresponding to luminance variations, while removing the objectionable noise and low amplitude components caused by the aperture correction process. The invention also circumvents the problem of distortion of the transitions inherent in the prior art coring technique of previous mention.

To this end, a tapped delay line is employed in conjunction with an associated video detail signal generator means to generate a conventional aperture correction signal along the video detail path. The tapped delay line is further selectively coupled to detector/gating circuit means to provide a pre-determined gate signal, along the respective gating path formed by the latter means, in response to video detail transitions representing luminance variations. More particularly, the gate signal generated by the detector/gating circuit means comprises a gate pulse having a selected time period and a selected phase coherence relative to the waveform of the aperture correction signal corresponding to a video detail transition. The time period and the phase coherence of the gate pulse are generally defined by the tapped delay line. The gate pulse is introduced to a gate means which also receives the conventional aperture correction signal from the video signal generator means. The gate means is enabled in response to the gate pulse to generate an improved output video detail signal which contains not only the transition enhancement provided by the aperture correction process, but also the objectionable noise cancellation provided by the detection/gating process. When video detail transitions are not present in the video signal introduced to the tapped delay line, or are low enough in amplitude such as is defined by noise, the gate means is disabled, ergo, is not turned on since there is no gating pulse generated.

The amplitude response versus frequency of the gating signal follows a 1-cosine curve where the output is equal to 1-Cos (time delay of line × ω) radians. If the video detail transitions have frequency components, for a given amplitude, in the very low frequency region, or in the upper frequency region around 7.2 megaHertz, the gate means likewise is not enabled, and the amplitude response of the improved, output video detail signal will display severe attenuation at the corresponding low and high frequencies outside the passband. That is, the video detail signal above and below a selected passband are not allowed to pass the gate means.

BRIEF DESCRIPTION OF THE DRAWINGS

FIG. 1 is a block diagram illustrating the aperture correction/gateable coring circuit system of the invention combination.

FIG. 2 is a block diagram illustrating in more detail an embodiment of the combination of FIG. 1.

FIGS. 3A–3H are a series of waveforms in the time domain, which are generated at various points along the circuit of FIG. 2, and represent the theoretical operation of the invention combination.

FIGS. 4, 5 and 6 are waveforms in the frequency domain, which represent the frequency response of the system of FIG. 2.

DESCRIPTION OF THE PREFERRED EMBODIMENT

Referring to FIG. 1, a typical input video detail signal $E_{in}$, provided here via generator 10, is introduced to time delay means, generally represented by the dashed block and numeral 12, and comprising any of various configurations of terminated or unterminated delay lines and/or filter circuits in various possible combinations. Examples of the time delay means are illustrated hereinafter; it suffices here to note that the time delay means provides at least one pair of selectively delayed waveforms $E_1$ and $E_2$ to a video detail signal generator means 14 along a video detail signal path, and at least one pair of selectively delayed waveforms $E_1$ and $E_3$ to detection means 16. The detection means 16 provides a waveform $E_7$ to a gate generator means 18 to define therewith a gating signal path.

The video detail signal generator means 14 provides a waveform $E_5$, which defines a conventional aperture correction signal, to gate means 20, which is enabled via a gating pulse waveform $E_8$ applied thereto along the gating signal path from the gate generator means 18. When enabled, gate means 20 passes the waveform $E_5$ to provide a waveform $E_9$ to adder means 22, which also receives the waveform $E_1$ from the time delay means 12 via a selected trim delay 24. The waveform $E_9$ contains the high frequency information which complements the aperture losses of the original signal but has the objectionable noise and low amplitude components removed. The added waveforms $E_1$ and $E_9$ comprise the enhanced output video signal in a monochrome television system, or the waveform $E_9$ can be made available for delivery to an encoder means (not shown) as an additional luminance input in a typical color television processing system.

It may be seen that the video detail signal enhancing circuitry of FIG. 1 provides a time delay means which provides waveforms having a preselected relationship in response to luminance transitions of selected amplitude and bandwidth in the input video detail signal. As previously mentioned, the waveforms have a selected time and phase relationship determined by the specific implementation and associated application of the system within the overall television system. Specific relationships are further described in subsequent FIGS. 2–6. The signal applied to the video detail signal generator means 14, is the conventional aperture correction signal for sharpening the luminance transition signal, and upon which noise cancellation is to be performed via the gateable coring process in accordance with the invention combination. The gateable coring process is initiated via the waveforms applied from the time delay means 12 to the detection means 16, which determines the gating pulse waveform $E_8$ characteristics. The aperture correction signal $E_5$ is thus selectively enabled in response to the gating signal path to remove the objectionable noise and low amplitude components.

To illustrate, FIG. 2 depicts one embodiment of the invention and FIGS. 3A–3H illustrate the waveforms $E_{in}$ through $E_{out}$ generated at various points along the embodiment. The time delay means 12 comprises a pair of unterminated delay lines 26, 28 which represent, in essence, a tapped delay line. The generator 10 applies the input video detail signal $E_{in}$ to the time delay means 12, via an impedance matching resistor 30 coupled to the sending end of the delay lines 28, 26. The end delay 26 is not terminated, and the characteristic impedance of the lines is matched to the resistance of resistor 30. The delay line 26 is coupled at its open far end to the positive input of a differential amplifier 32, wherein the line 26 and amplifier 32 form a conventional aperture correction circuit which sharpens the incoming luminance transitions. The negative input to the amplifier 32 is coupled to the tap between delay lines 28, 26. The input video detail signal $E_{in}$ is also applied to the negative input of a differential amplifier 34 via resistor 30, with the positive input coupled to the open far end of the delay lines 28, 26. Thus waveforms $E_1$ and $E_2$ are applied to the amplifier 32 and waveforms $E_1$ and $E_3$ are applied to amplifier 34.

By way of example, the delay of delay line 28 is 56 nanoseconds (nsec.) while that of line 26 is 84 nsec. Thus the period of the step on waveform $E_2$ (FIG. 3B) when $E_{in}$ defines a luminance transition, is 168 nsec., which is the time taken for the incoming transition to travel to the end of delay line 28 (i.e., the beginning of delay line 26), to the end of delay line 26, and to return to the junction of lines 28 and 26. Waveform $E_1$ (FIG. 3A) is the video detail transition of given rise time. Waveforms $E_1$ and $E_2$ are subtracted in the differential amplifier 32, and the resultant output is in the waveform $E_5$ (FIG. 3C). The amplitude response resulting from this subtraction corresponds to the aperture correction signal, and follows a 1-cosine law with frequency, where $E_5 = 1\text{-cosine}$ (delay of line 26 times $\omega$) radians. The amplitude response is shown in the frequency response curve of FIG. 4, wherein amplitude response is plotted against frequency. For a 84 nsec. delay, the amplitude peak in the frequency response occurs at 5.95 megaHertz (MHz). The waveform $E_5$ is the conventional aperture correction signal which contains the emphasized high frequency noise due to the luminance transition sharpening process, as shown in FIG. 3C. It is this noise which is removed via the gateable coring process of the invention combination.

To this end, the tapped delay lines 28, 26, provide the waveform $E_3$ with a step period of twice the delay of the total delay lines 26 and 28, i.e., 280 nsec. (FIG. 3D). Note that in this example, the (gating signal path) waveform $E_6$ (FIG. 3E) is in phase coherence with the waveform $E_5$ (FIG. 3C). When the waveform $E_3$ is subtracted from waveform $E_1$ via the differential amplifier 34, the resultant waveform $E_6$ (FIG. 3E) is generated which also follows a 1-cosine law as depicted in FIG. 5, which is thus the frequency response curve showing the amplitude response versus the frequency of the waveform $E_6$. The signal $E_6$ (for given amplitudes) produces no output at very low frequencies, maximum output at 3.6 MHz, and no output at twice the frequency "peak," or 7.2 MHz.

The waveform $E_6$ is applied to a frequency doubler 36 and thence to a detector 38. The components 34, 36 and 38 comprise, in essence, the detection means 16 of FIG. 1, and may comprise a linear integrated circuit type MC-1330 fabricated by Motorola. The frequency doubler 36 and detector 38 thus may define a wideband detection means, which provides the waveform $E_7$ (FIG. 3F) corresponding to the incoming transition waveform $E_1$. Note in this example, that the period of waveform $E_7$ is wider than the total period of the desired aperture correction signal waveform $E_5$; i.e., the waveform $E_7$ begins prior to waveform $E_5$ a time period equal to delay line 28, and ends after $E_5$ a time period also equal to the delay of delay line 28. Thus the gating signal totally encompasses, and is in phase coherence with, the aperture correction signal $E_5$.

The waveform $E_7$ is then clipped above a pre-selected threshold 41 as shown in FIG. 5, via a threshold clipper circuit 40, which generates thus the gating pulse waveform $E_8$ (FIG. 3G), while removing the objectionable noise and low amplitude components depicted by curve 43, which also follows a 1-cosine law. The positive period of the waveform $E_8$ enables a gating amplifier 42 (corresponding to gate means 20 of FIG. 1) to selectively pass the waveform $E_5$, i.e., the aperture correction signal, to an adding amplifier 44, as waveform $E_9$ (FIG. 3H). The waveform $E_9$ comprises the improved gated aperture correction signal, which is enhanced with objectionable noise removed, in accordance with the invention. The video transition signal $E_1$ is delayed via the trim delay 24 to account for delays in the gating signal path, and is added to the waveform $E_9$ via the adding amplifier 44, to provide a monochrome television system signal $E_{out}$.

When luminance transitions $E_1$ are not present at the system input, or are low enough in amplitude, as in the case of noise, and are below the level 41 (FIG. 5) of the threshold clipper circuit 40, the gating amplifier 42 is disabled and waveform $E_9$ is not passed. In addition, if the luminance transitions have frequency components (for a given amplitude) that are in the very low frequency region (FIG. 5) or in the upper frequency region around 7.2 MHz, they will not enable the gated amplifier 42, and the resultant amplitude response of waveform $E_9$ will display severe attenuation (cutoff) at the corresponding low and high frequencies outside the passband of the system (FIG. 6). Ergo, the objectionable high frequency noise in the luminance transitions of gradual change (i.e., in the "flat" field area) of a television picture is removed by the gateable coring process.

It may be seen that the system of FIG. 2 is particularly adapted for use in a horizontal aperture correction and noise coring system, which determines the delay line time delays. In a horizontal correction system it is necessary to predetermine the beginning of a luminance transition so as not to pre-distort the shape of the correction signal to be derived from that transition. Accordingly, early detection is provided in FIG. 2 by the selection of relative delay line times, whereby the gating signal path waveform $E_6$ begins prior to, and ends after, the aperture correction signal $E_5$. In addition, the waveforms are in phase coherence, i.e., symmetrical about the center of the transition, as shown in the FIGS. 3A–3H.

However, the system of the invention combination may also be employed in vertical aperture correction processes, with delay line times corresponding to the rate of the vertical resolution, that is, the period of one television line. In vertical correction schemes the early detection feature may not be desired, however phase coherence is required. However, operation of the gateable coring process in conjunction with the aperture correction process is as described relative to the systems of FIGS. 1 and 2. Examples of the vertical and/or horizontal enhancing techniques and implementation therefor are shown in the McMann, Jr. article of previous mention, and are therefore not further described herein.

The delay lines 26, 28 of FIG. 2 may be replaced by other means for providing selected delay times such as, for example, filter networks. Combinations of delays from such networks provide frequency response curves which complement a Gaussian loss rather than follow the 1-cosine law of previous mention. In addition, combinations of delay lines and filter networks may be employed. Examples of using such filter networks, delay lines, and/or combinations thereof are shown in the Thiele article of previous mention, and thus are not further described herein.

Obviously, terminated delay lines may be employed in place of the open ended lines shown in FIG. 2, wherein the replacement is generally well known in the art and not described herein.

I claim:

1. A system for removing objectionable low amplitude components from aperture correction signals generated via video signal generating means, comprising the combination of;

time delay means integral with the video signal generating means and responsive to luminance transitions in the video signals;

gateable coring means including gate means operably coupled to the time delay means and responsive to the luminance transitions for generating gating signals separate from the aperture correction signals and having time periods which are in phase coherence with and encompass respective transitions, wherein said gating signals enable said gate means to pass only those selected portions of the aperture correction signals in the region of the transitions which do not contain the objectionable low amplitude components; and said gating signals have a frequency response different than the frequency response of the aperture correction signals, wherein the gating signals generate a cutoff in the region of the peak amplitude response at the upper limit of the system passband.

2. The system of claim 1 wherein the gating signals encompassing the luminance transitions begin a short time period prior to and end a short time period after the transitions, the time period being determined by the time delay means and providing early detection of an incoming luminance transition.

3. A system for enhancing the transitions corresponding to luminance variations of an input video signal while removing objectionable high frequency noise and low amplitude components conventionally emphasized by the enhancing process, comprising the combination of;

means for generating an aperture correction signal along a video signal path, the signal having a selected frequency response and having enhanced luminance transitions and emphasized high frequency noise;

gateable coring means for generating a gating signal along a gating signal path which is separate from the video signal path, the gating signal having a frequency response different that that of the aperture correction signal and being of selected time period and phase coherence relative to the aperture correction signal; and gate means disposed in the video signal path for selectively passing the aperture correction signal in response to the gating signal introduced via the gating signal path to provide an aperture corrected output video signal only during the luminance variations of the input video signal.

4. The system of claim 3 further including;

time delay means integral to the means for generating an aperture correction signal and the gateable coring means for providing a pair of waveforms with the selected relative time periods and phase coherence and corresponding to the transitions wherein the waveforms are introduced to respective video signal and gating signal paths.

5. The system of claim 4 wherein the gateable coring means includes;

threshold clipping means integral therewith along the gating signal path for clipping the gating signal at a selectable threshold level above the objectionable noise and low amplitude components in the system passband.

6. The system of claim 5 wherein the frequency response of the gating signal disables the gate means in the video signal path to cutoff the aperture correction signal at selected upper frequencies of the system passband.

7. The system of claim 6 wherein;

the time delay means comprises a tapped delay line of selected relative time delays;

the aperture correction signal generating means includes first differential amplifier means disposed along the video signal path and selectively coupled to the tapped delay line; and said gateable coring means further includes detection means disposed along the gating signal path and selectively coupled to the tapped delay line for providing the gating signal which is in phase coherence with the luminance transition in the video signal path.

8. The system of claim 7 wherein;

the detection means includes second differential amplifier means selectively coupled to the tapped delay line, wherein the signal generated thereby has a time period which encompasses a respective luminance transition;

frequency doubler means coupled with the second differential amplifier means;

detector means coupled with the frequency doubler means; and wherein the threshold clipping means is coupled with the detector means and provides the gating signal along the gating signal path which encompasses a respective luminance transition, said gating signal enabling the gate means to pass only portions of the aperture correction signal encompassing the transitions to remove the objectionable noise and low amplitude components.

* * * * *